United States Patent

[11] 3,617,128

| [72] | Inventor | Donald M. Harvey |
| | | Rochester, N.Y. |
| [21] | Appl. No. | 771,209 |
| [22] | Filed | Oct. 28, 1968 |
| [45] | Patented | Nov. 2, 1971 |
| [73] | Assignee | Eastman Kodak Company |
| | | Rochester, N.Y. |

[54] AUTOMATIC RANGEFINDER MEANS
12 Claims, 8 Drawing Figs.

[52] U.S. Cl. ................................................ 356/4, 95/44
[51] Int. Cl. .................................................. G01c 3/08
[50] Field of Search ..................................... 356/152, 4

[56] References Cited
UNITED STATES PATENTS

| 3,435,744 | 4/1969 | Stimson | 356/4 |
| 3,147,335 | 9/1964 | Guerth | 356/4 |
| 2,960,908 | 11/1960 | Willits | 356/4 |
| 2,732,539 | 1/1956 | Andreson | 356/4 |

*Primary Examiner*—Rodney D. Bennett, Jr.
*Assistant Examiner*—Joseph G. Baxter
*Attorneys*—Robert W. Hampton and James J. Wood ABSTRACT: This disclosure relates to an automatic rangefinder utilizing refracted light from a subject to ascertain range distance. Light is transmitted toward the subject, and the refracted light is received by an optical system suitably masked so as to admit the refracted light only around peripheral portions. Photosensitive materials are arranged at the image plane of the optical system, the photosensitive materials having a predetermined geometrical configuration wherein predetermined loci are functions of range distance. The discrete locus delineated by the refracted light at the image plane is then identified to determine range distance.

PATENTED NOV 2 1971 3,617,128

DONALD M. HARVEY
INVENTOR.

BY *James J. Wood*
*Robert W. Hampton*
ATTORNEYS

DONALD M. HARVEY
INVENTOR.
BY James J. Wood
Robert W. Hampton
ATTORNEYS

AUTOMATIC RANGEFINDER MEANS

BACKGROUND OF THE INVENTION

1. Field of the Invention

This invention relates to an automatic rangefinder suitable for use in a photographic camera or the like, utilizing refracted radiant energy from a subject to ascertain range distance.

2. Description of the Prior Art

It is broadly known in the art to use reflected radiant energy from a subject for the purpose of determining range distance. U.S. Pat. No. 1,866,581 to Simjian for "Self-Focusing Camera," describes a technique for maintaining a camera in focus where the subject makes limited excursions from a nominal position. The radiant energy interrupted by the subject falls on a photoelectric cell, and the variable photoelectric current generated by the incident light energy is then used to control the focusing of the camera.

Similarly U.S. Pat. No. 2,524,07 to Kallmann for "Optical Automatic Range Determining Device," describes a number of types of automatic range-finding devices utilizing an interceptor grating rotating along the optical axis of an optical system, so as to intercept an incident light beam at succesive image planes beginning with that of the nearest object. The light flowing through the interrupter vanes is collected on a photocell, and the varying photoelectric currents after amplification, are then used to develop an audio signal which is a function of range distance.

SUMMARY OF THE INVENTION

This invention relates to an automatic rangefinder means suitable for use in a photographic camera or the like, wherein range distance is determined by means of refracted light from a subject. Means are provided for transmitting light toward a subject, and the refracted light is received by an optical lens system suitably masked so as to admit light only around predetermined peripheral portions. The image plane for the optical system may be located either at the focal length of the optical lens system or it may be positioned beyond the focal length, so that the diameter or radius of the received image with respect to the optical axis, varies inversely, or directly as the range distance, respectively. Photosensitive means, positioned at the selected image plane, are arranged to have a geometrical configuration, such that predetermined loci are functions of range distance. Means are then provided for identifying the discrete locus delineated by the refracted light pattern from the subject, to thereby determine range distance.

It is an object of this invention to provide a rangefinder in which the determination of range distance is achieved automatically to eliminate human error based on subjective judgments.

The novel features of the invention are set forth particularly in the appended claims. The invention itself, however, both as to its organization and method of operation, together with further objects and advantages thereof, may best be understood by reference to the description to follow considered in connection with the accompanying drawings.

DESCRIPTION OF PREFERRED EMBODIMENTS

Before preceding with the detailed description of the automatic rangefinder means it will be helpful to briefly describe the environmental setting in which the invention may be advantageously utilized.

Figure 1:
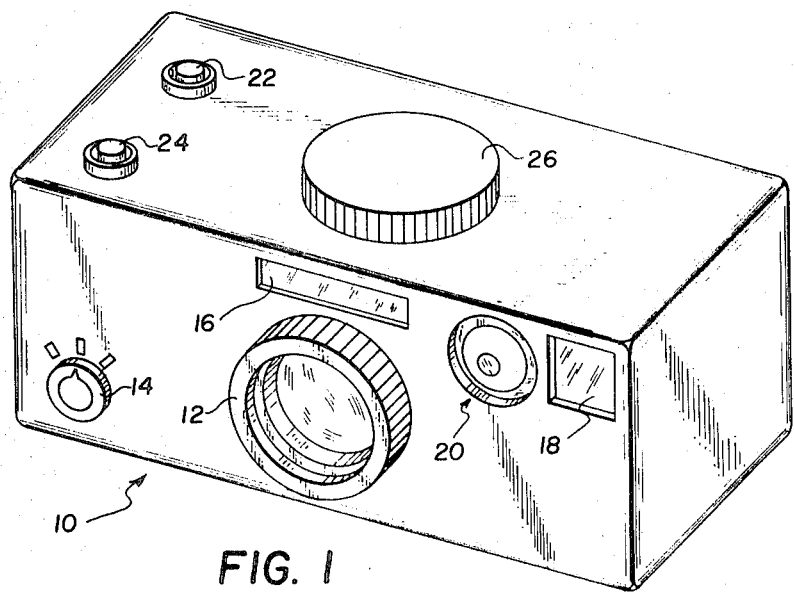
FIG. 1 is a pictorial view of a photographic camera utilizing the automatic rangefinder means in accordance with the invention.

The automatic rangefinder means may be incorporated as part of a photographic camera, but it should of course be understood that the inventive concept is equally useful in any apparatus where automatic range finding is required. Referring now to FIG. 1, the automatic rangefinder means is illustrated as part of a photographic camera indicated generally at 10. The principal parts of the photographic camera are: the objective lens indicated at 12, the shutter-setting dial 14, the photometric detector 16, the viewfinder 18, and the automatic rangefinder means indicated generally at 20, range finding release member 22, lens shutter release member 24, and film-winding advance member 26.

Figure 2:
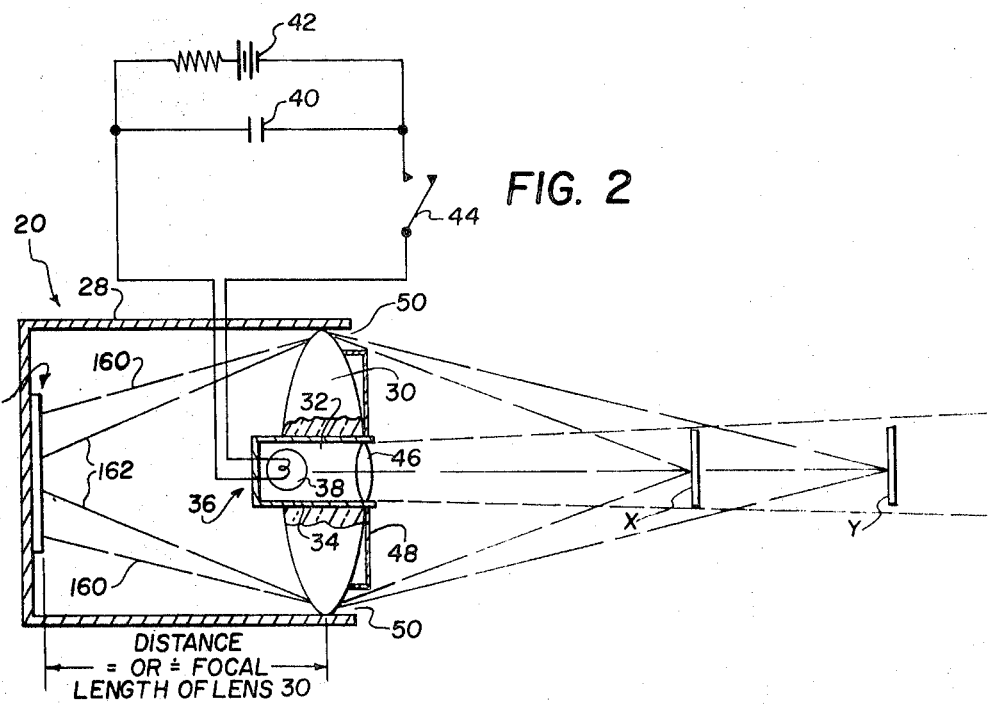
FIG. 2 is an explanatory and schematic diagram showing one embodiment of the optical arrangement of the automatic rangefinder means in accordance with the invention.
Figure 3:
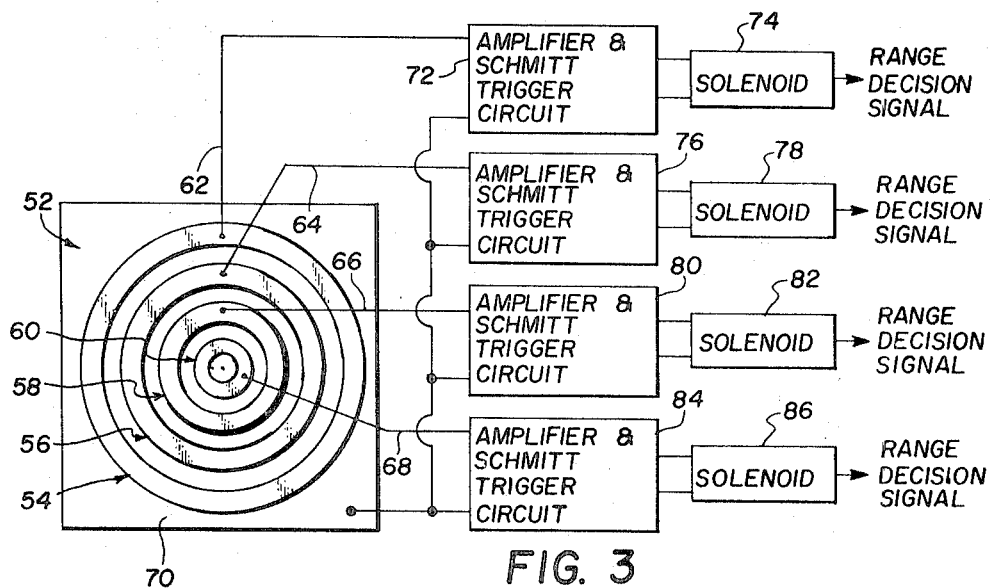
FIG. 3 is one geometric configuration for the photosensitive means, shown cooperating with the identification circuitry means of the automatic rangefinder in accordance with the invention.

Referring now to FIGS. 2 and 3, which together disclose one illustrated embodiment, the automatic rangefinder means 20 comprises a housing member 28 having a spherical lens 30 positioned at the forward end. The spherical lens 30 is centrally apertured at 32 to receive coaxially mounted lighttight housing 34. A pulsating light source, indicated generally at 36, comprises a light source proper, which may be a light bulb 38, a capacitor 40, a DC source, which may conveniently be a dry cell 42, and a switch 44; the dimensional arrangement of the components is such that source 36 approximates a point source. As may be seen, the filament of lamp 38 and the switch 44 are arranged in series, while the capacitor 40 is in parallel with the dry cell 42. The forward end of housing 34 is provided with a spherical lens 46 which produces a substantially collimated light beam when the pulsating light source 38 is energized.

The lens 30 is stopped or masked by any convenient means 48 so as to provide a ring-shaped light-emitting aperture identified by the numeral 50. As will be explained subsequently in greater detail, the image plane for the lens 30 may be chosen either beyond the focal length of the lens or it may be substantially at the focal length of the lens. Here in the illustrative embodiment of FIG. 2, the depth of housing 28 is equal to or preferably slightly less than the focal length of spherical lens 30. At this depth (which is the image plane of lens 30), the housing 28 supports photosensitive means indicated generally at 52. The photosensitive means 52 may conveniently assume any one of a number of geometric configurations such as depicted for illustrative purposes in FIGS. 3, 4 and 5C.

In FIG. 3 the photosensitive means 52 is illustrated as comprising a number of (here illustrated as four) photovoltaic cells indicated generally at 54, 56, 58, 60, arranged as concentric rings with a common base electrode indicated at 70. The photovoltaic cells are of the selenium type, having the negative electrodes in the shape of concentric rings as shown with layers of N-type cadmium oxide and P-type selenium respectively between them and the common positive electrode 70, which may be of steel, aluminum or brass.

The photovoltaic cells 54, 56, 58 and 60 have their negative electrodes connected by leads indicated at 62, 64, 66 and 68 to amplifier and Schmitt trigger circuitry indicated at 72, 76, 80 and 84 respectively. As will be discussed subsequently, each amplifier and Schmitt trigger circuit, such as 72 for example, will deliver an output signal when the associated photovoltaic cell, such as 54 for example is energized, by incident radiation; with the identified components 54, 72, this will be the case when the subject is nearest to the photographic camera. Completing the description of FIG. 3, the Schmitt trigger circuitry 72 is connected to a solenoid indicated in block form at 74. Similarly, amplifier and Schmitt trigger circuitry 76, 80 and 84 are provided with solenoid mechanisms at 78, 82 and 86 respectively.

As will be apparent as the description proceeds, the inventive concept is based upon discernment and precise identification among concentric refracted light image patterns. In some applications, the refracted images may be rather close together as to make difficult the identification of one active photovoltaic cell from another. In these latter applications, the geometric configurations shown in FIG. 4 will provide for more easy identification. As will be seen in FIG. 4 the photovoltaic cells have arcuate negative electrodes; the photovoltaic cells are identified generally at 88, 90, 92, 94 and 96 and the base positive electrode shared in common is identified at 98.

Figure 5A:
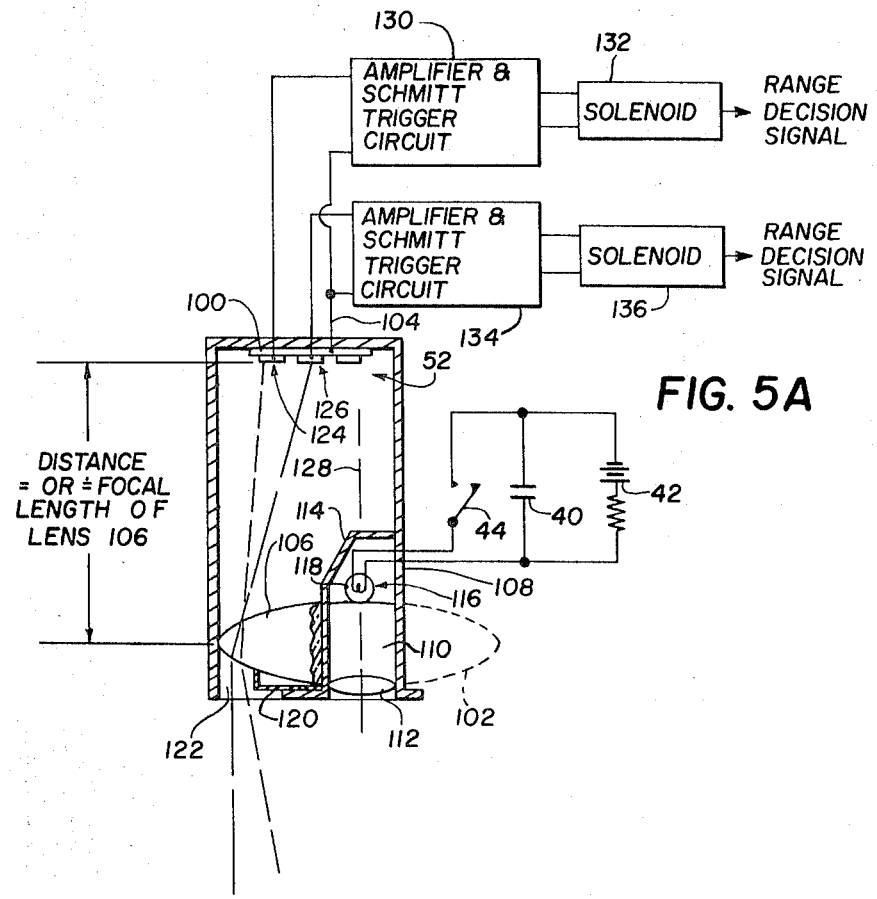
FIGS. 5A, 5B and 5C are schematic diagrams of additional modifications for various components of the automatic rangefinder means in accordance with the instant invention.
Figure 5B:
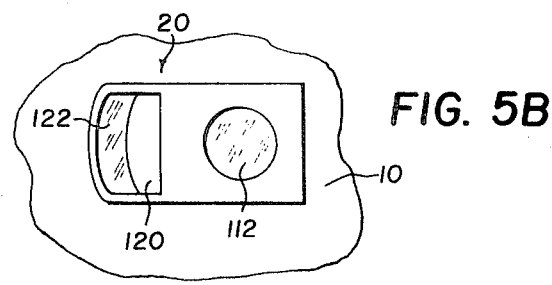
Figure 5C:
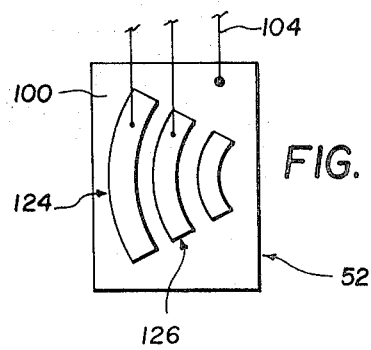

In FIG. 5A and 5C there is shown still another geometric configuration for the photosensitive means 52, and in addition, the larger spherical lens and pulsating light source have been somewhat modified. The photosensitive means 52 here comprises photovoltaic cells indicated generally at 124, 126 having arcuate negative electrodes (as best shown in FIG. 5C), with a common positive electrode identified at 100; electrical connection to the common positive electrode is made by means of lead 104.

In FIG. 5A, a spherical lens 106 is supported within a lighttight housing 108, the inactive portion of lens 106 extending therefrom and identified on dotted section at 102. As in the previous embodiment the spherical lens 106 is provided with a centrally located aperture 110 in which a coaxially aligned spherical lens 112 (FIGS. 5A, 5B) is mounted in a separate lighttight housing 114 which includes a pulsating light source indicated generally at 116. The pulsating light source is the same as that shown in FIG. 2, with the exception that incandescent lamp 118 has a vertically aligned straight-line filament — the remaining numeration of FIG. 2 has therefore been retained in identifying the components comprising pulsating light source 116. The spherical lens 106 is masked or stopped by material 120 (FIGS. 5A, 5B) so as to provide an arcuate light-admitting aperture 122.

The lighttight housing 108 has a depth dimension equal to or slightly less than the focal length of lens 106. On the image plane of lens 106, the lighttight housing 108 supports the photosensitive means 52. The photovoltaic cells 124, 126 are positioned at predetermined radii with respect to optical axis 128 which is common to spherical lenses 106, 112. Each photovoltaic cell 124, 126 is provided with its respective amplifier Schmitt trigger circuit, and solenoid identified at 130, 132; 134, 136 respectively. As may be seen from FIG. 5A, the negative electrodes of the photovoltaic cells 124, 126 are connected to the Schmitt trigger circuitry 130, 134 respectively, with the lead 104 providing a common positive electrode input to the Schmitt trigger for all the photovoltaic cells.

As will be explained under the caption *Operation of the Embodiments*, the automatic rangefinder means derives a signal indicative that the correct range distance has been established. It is within the contemplation of the instant invention to use this range decision signal to displace the objective lens after the range distance has been ascertained, or the objective lens can be displaced concurrently with the selection of mechanisms for determining range distance, so that when the decision has been made as concerns range distance, the objective lens is already in correct focus.

Figure 6:
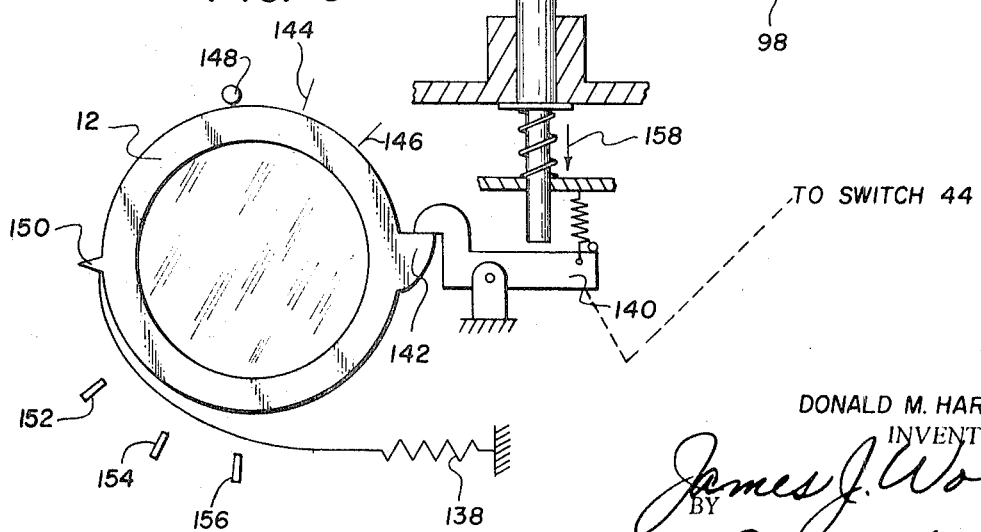
FIG. 6 is a schematic diagram illustrating the cooperation of the solenoids with a camera objective for arresting displacement of the camera objective when range distance has been determined.

An example of the latter arrangement, wherein the objective lens 12 is displaced concurrently with the range determination mechanisms, is shown in FIG. 6. For illustrative purposes, the FIG. 6 arrangement will be described in cooperative array with the embodiment of FIG. 5A, 5B, 5C, but it could be utilized with any of the other modifications of the photosensitive means 52 or with the modification of the optical means shown in FIG. 2. In FIG. 6 the objective lens 12 is biased by spring means 138 for rotation in the counterclockwise direction, and is held against rotation by means of a rocker arm 140 arranged to engage a projection 142 on the periphery on the objective lens 12. The housing of the lens 12 may be provided with teeth, (not shown), so that rotation of the objective lens may be arrested by pawl members applied at 144, 146 etc., the pawl members being actuated for example, by the solenoids 132, 136 etc. A stop pin 148 prevents further displacement, if rotation of objective lens 12 is not arrested by the combined action of any solenoid-pawl combination. An indicator 150 may be suitably positioned on the objective lens 12 to point to the appropriate range distance marks 152, 154, 156 to visually indicate the distance in feet or meters when the range distance has been ascertained.

OPERATION OF THE EMBODIMENTS.

Before proceeding with a detailed description of the operation of the embodiments, it will be helpful to briefly discuss the theory of operation. In those embodiments where the image plane of the optical system is at or slightly less than the focal length of the optical system, the automatic range finder means of this invention projects a collimated light beam toward a subject (for which range distance is required), and the refracted light is received through a ring-shaped aperture (such as FIG. 2) to produce a light image ring having a mean diameter inversely proportional to the subject distance. Stated mathematically:

(1) $d = f(1/s)$ where $d$ = mean diameter of the refracted image
$s$ = the distance to the subject from the image plane.

Thus the nearer the subject to the image plane (in practical terms, the photographic camera), the larger the diameter. Since the diameter of a circle is related to the radius, it also follows that:

(2) $r = f(1/s)$

Where $r$ = the means radius of the refracted image with respect to the optical axis of the optical system, and $s$ = the distance from the subject to the plane of the refracted image.

The photosensitive means 52 depicted in FIGS. 5A, 5B and 5C utilize the mathematical relationship set forth in equation (2).

When the image plane is selected to be at a distance greater than the focal length of the optical lens system, the relationship expressed by equation (1) becomes:

(3) $d = f(s)$ and the relationship expressed by equation (2) becomes:

(4) $r = f(s)$ where $d$ and $s$ have the same meaning as defined above.

Referring now back to FIG. 2, (where the image plane is substantially at the focal length of lens 30), a subject at distance X, will have a larger diameter, (as shown by light rays 160) then will a subject at Y (as indicated by light rays 162.) (Incidentally as indicated in FIG. 2, the light beam from pulsating light source 36 is slightly divergent, but with the order of magnitude of range distances, with which we are here concerned, it may be considered substantially collimated). For a given optical geometric configuration, at each range distance $x$, $y$, $z$ etc., there is thus a definitive diameter $d_x$, $d_y$, $d_z$ etc. or a definitive radius $r_x$, $r_y$, $r_z$ etc. Therefore, the identification of a radius or a diameter associated with a discrete subject distance, determines the range distance to that subject.

When the operator desires to use the camera, the automatic focus release member 22 is depressed; this closes switch 44 for energizing the pulsating light source 36 (FIG. 2). (The Schmitt trigger and associated electrical circuitry is separately energized by appropriate electrical sources.) Assume that a subject is at some distance from the photographic camera of FIG. 1, and that the automatic rangefinder means 20 has a photosensitive means 52 of the configuration shown in FIG. 3. The respective concentric selenium photovoltaic cells 54, 56, 58 and 60 will generate a voltage upon receiving light energy. Assume that the subject is nearest to the camera so that the refracted ring image will be the negative electrode of photovoltaic cell 54 (the subject farthest away would fall on photovoltaic cell 60). There may be some overlap of the refracted ring images, so that some incident radiation will fall on photovoltaic cell 56; however, the Schmitt trigger circuits of 72, 76 are arranged so that they will respond only when a minimum signal level is equalled or exceeded, and therefore only Schmitt circuitry 72 will respond energizing solenoid 74.

The camera can be arranged so that the objective lens 12 is displaced concurrently from a hyperfocal setting to a near setting or conversely. The solenoid 74 therefore actuates a pawl member which engages rack teeth on the objective lens housing, arresting further rotational displacement. The camera user then depresses release member 24 which opens the shutter blades in any conventional manner to complete the photographic exposure.

The camera can also be arranged so that the selected solenoid 74 actuates a stop or arresting member (not shown). The camera user then depresses release member 24, and in chronological order, the objective lens 12 is first displaced (from a hyperfocal setting to a near setting or conversely) to the displacement permitted by the arresting member, and the shutter blades are then actuated to effect exposure of the photographic film.

Figure 4:
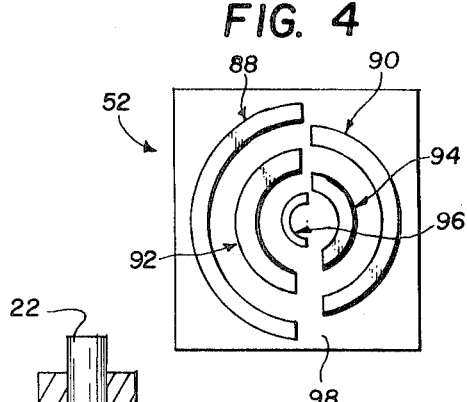
FIG. 4 is another geometric configuration for the photosensitive means of the automatic rangefinder of the invention.

The photosensitive means 52 of FIG. 4, operates exactly the same way, but the geometric pattern of the photosensitive materials permits for more precise identification of range distance, identifying diameters or radii.

The photosensitive means 52 of FIG. 5A operates in a similar manner, and is particularly adaptable for zone identification of range.

Assume the configuration of FIGS. 5A, 5B, 5C and 6 is incorporated in the photographic camera shown in FIG. 1. As illustrated in FIG. 6, the objective lens 12 will be displaced from a near setting to a hyperfocal setting. When the camera user depresses automatic range-finding release member 22 in the direction indicated by arrow 158 FIG. 6, this pivots rocker arm 140, releasing the objective lens 12, and under the discipline of biasing spring 138, it rotates in the counterclockwise direction. Again assume the subject is closest to the photographic camera. The refracted image passing through aperture 122 impinges on the arcuate negative electrode of photovoltaic cell 124 causing solenoid 132 to be energized; this action actuates a pawl member in the region indicated at 146, arresting further displacement of objective lens 12. The indicator 150 points to mark 152 visibly displaying the range distance. Next the shutter release member 24 is depressed to expose the photographic film.

The invention has been described in detail with particular reference to preferred embodiments thereof, but it will be understood that variations and modifications can be effected within the spirit and scope of the invention.

I claim:

1. In a rangefinder, the combination comprising:
   a. means for projecting a beam of light to an object to illuminate a predetermined area of the surface of the object;
   b. a lens for forming an image of the illuminated object area in a plane, the location of the image in the plane being a function of the distance of the object from the plane;
   c. a plurality of photosensitive means, each of said photosensitive means being disposed in a predetermined location in the plane and having a parameter which varies as a function of incident illumination; and
   d. means coupled to said plurality of photosensitive means and responsive to variations in the parameters thereof to determine the location of the image.

2. In a rangefinder, the combination comprising:
   a. means for projecting a beam of light to an object to illuminate a predetermined area of the surface of the object;
   b. a lens for forming an image of the illuminated predetermined object area in a plane, said lens being adapted to form the image having at least one selected portion of greater brightness than the remaining portions thereof, the location of the selected image portion in the plane being a function of the distance of the object from the plane;
   c. a plurality of photosensitive means, each of said photosensitive means being disposed in a predetermined location in the plane and having a parameter which varies as a function of incident illumination; and
   d. means coupled to said plurality of photosensitive means and responsive to variations in the parameters thereof to determine the location of the image.

3. In a rangefinder, the combination comprising:
   a. means for projecting a beam of light to an object to illuminate a predetermined area of the surface of the object;
   b. a lens for forming an image of the illuminated predetermined object area in a plane, said lens being adapted to form the image to have at least one selected portion having greater brightness than the remaining portions thereof, the location of the selected image portion in the plane being a function of the distance of the object from the plane;
   c. a plurality of photosensitive means, each of said photosensitive means having a parameter which varies as a function of incident illumination and being disposed in a predetermined location in the plane and adapted to receive illumination from the selected image portion when the object is disposed within a particular range of distances from the plane; and
   e. means coupled to said plurality of photosensitive means and responsive to variations in the parameters of said plurality of said photosensitive means to determine the particular range of distances from the plane wherein the object is disposed.

4. The invention as set forth in claim 3 wherein said lens is a converging lens and includes an annular portion for receiving light reflected from the object to form the image.

5. In a rangefinder, the combination comprising:
   a. a lens defining an optical axis;
   b. a source of light;
   c. means cooperatively disposed with respect to said light source for projecting a beam of light from said source to an object disposed along said optical axis to illuminate a predetermined area of the surface of the object;
   d. said lens being adapted to form an image of the illuminated predetermined object area in a plane disposed a fixed distance substantially equal to or greater than the focal length of said lens from said lens, said lens being adapted to form the image to have at least one selected portion having greater brightness than the remaining portion thereof, the location of the selected image portion in the plane being a function of the distance of the object from the plane;
   e. a plurality of photosensitive means, each of said photosensitive means having a parameter which varies as a function of incident illumination and being disposed in a predetermined location in the plane and adapted to receive light from the selected image portion when the object is disposed within a particular range of distances from the plane; and
   f. means coupled to said plurality of photosensitive means and responsive to variations in the parameters thereof to determine the particular range of distances wherein the object is disposed.

6. The invention as set forth in claim 5 wherein said plurality of photosensitive means comprises a plurality of photoresponsive cells, each being formed in the shape of a concentric ring and each associated with a different particular range of distances from the plane.

7. The invention as set forth in claim 6 wherein said distance signal producing means comprises means for determining which of said photoresponsive cells receives the greatest incident illumination.

8. The invention as set forth in claim 5 wherein said lens comprises a spherical lens effectively masked so as to admit light only around the peripheral portions thereof.

9. The invention as set forth in claim 5 wherein said light source includes means for modulating said light at a predetermined frequency.

10. For use in a photographic apparatus adapted to focus a first image of an object in a primary image plane by varying the relative distance between an objective lens and the object, the combination comprising:
   a. a second lens defining an optical axis;
   b. a source of light;
   c. means cooperatively disposed with respect to said light source for projecting a beam of light from said source along said optical axis to illuminate a predetermined area of the object surface;
   d. said second lens being adapted to form a second image of the illuminated predetermined object area in a second plane disposed a fixed distance from said second lens substantially equal to or greater than the focal length of said second lens, said second lens being adapted to form the second image to have at least one selected portion having greater brightness than the remaining portions thereof, the location of the selected second image portion in the second plane being a function of the distance of the object from the second plane;
   e. a plurality of photosensitive means each having a parameter which varies as a function of incident illumination and each being disposed in a predetermined location in the second plane and adapted to receive illumination from the selected portion of the second image when the object is disposed within a particular range of distances from the second plane;
   f. means coupled to said plurality of photosensitive means and responsive to variations in the parameters thereof to produce a signal representative of the particular range of distances wherein the object is disposed; and
   g. means coupled to the objective lens and responsive to said signal to position the objective lens to focus the first image of the object in the primary image plane.

11. The invention as set forth in claim 10 wherein said lens comprises a spherical lens effectively masked so as to admit light only around the peripheral portions thereof.

12. The invention as set forth in claim 10 wherein said light source includes means for modulating said light at a predetermined frequency.

* * * * *